(12) United States Patent
Holt et al.

(10) Patent No.: US 7,682,117 B2
(45) Date of Patent: Mar. 23, 2010

(54) WORK PIECE ISOLATING ASSEMBLY

(75) Inventors: Jason Holt, St Charles, IL (US); Albert W. Van Boven, Barrington, IL (US); William G. Stlaske, Crystal Lake, IL (US); Glenn G. Heavens, Cheshire, CT (US); Robert Schaser, Lake Zurich, IL (US); Jeremy Tuttle, Dearborn, MI (US)

(73) Assignee: Illinois Tool Works Inc., Glenview, IL (US)

( * ) Notice: Subject to any disclaimer, the term of this patent is extended or adjusted under 35 U.S.C. 154(b) by 58 days.

(21) Appl. No.: 11/860,883

(22) Filed: Sep. 25, 2007

(65) Prior Publication Data

US 2008/0075403 A1  Mar. 27, 2008

Related U.S. Application Data

(60) Provisional application No. 60/847,452, filed on Sep. 27, 2006.

(51) Int. Cl.
*F16B 21/00* (2006.01)

(52) U.S. Cl. .................................... 411/156; 403/408.1

(58) Field of Classification Search ............. 403/408.1; 411/149, 150, 156, 544, 999
See application file for complete search history.

(56) References Cited

U.S. PATENT DOCUMENTS

| | | | | |
|---|---|---|---|---|
| 2,278,062 | A * | 3/1942 | De Koharovich | 411/144 |
| 3,016,941 | A * | 1/1962 | Coldren | 411/134 |
| 3,552,785 | A * | 1/1971 | Elder et al | 403/197 |
| 4,193,434 | A * | 3/1980 | Wagner | 411/154 |
| 4,292,007 | A * | 9/1981 | Wagner | 411/156 |
| 4,334,599 | A * | 6/1982 | Ritsema et al. | 188/73.45 |
| 4,575,114 | A * | 3/1986 | Camp | 280/124.152 |
| 4,783,039 | A | 11/1988 | Peterson et al. | |
| 4,863,329 | A * | 9/1989 | Wilson | 411/339 |
| 4,975,008 | A * | 12/1990 | Wagner | 411/337 |
| 5,022,371 | A * | 6/1991 | Daly | 123/468 |
| 5,044,338 | A * | 9/1991 | Shelton | 123/469 |
| 5,056,975 | A * | 10/1991 | Ando | 411/155 |
| 5,131,638 | A * | 7/1992 | Hein et al. | 267/220 |
| 5,170,985 | A | 12/1992 | Killworth et al. | |
| 5,244,325 | A * | 9/1993 | Knohl | 411/353 |

(Continued)

FOREIGN PATENT DOCUMENTS

DE 19916098 10/2000

(Continued)

OTHER PUBLICATIONS

International Search Report and Written Opinion for PCT/US07/79485.

*Primary Examiner*—Victor MacArthur
*Assistant Examiner*—Joshua T Kennedy
(74) *Attorney, Agent, or Firm*—Mark W. Croll; Paul F. Donovan

(57) ABSTRACT

An isolating connector between a first work piece and a second work piece each defining a hole therein includes first and second spring members that capture the first work piece between flanges of the spring members and establish a column between the second work piece and a head of a bolt extending through the first and second spring members and anchored in the second work piece.

19 Claims, 8 Drawing Sheets

U.S. PATENT DOCUMENTS

| | | | | |
|---|---|---|---|---|
| 5,255,647 | A * | 10/1993 | Kiczek | 123/195 C |
| 5,328,311 | A * | 7/1994 | Knohl | 411/353 |
| 5,597,173 | A * | 1/1997 | Schindler et al. | 280/124.147 |
| 5,807,052 | A * | 9/1998 | Van Boven et al. | 411/353 |
| 6,176,665 | B1 * | 1/2001 | Bondarowicz et al. | 411/424 |
| 6,280,132 | B1 * | 8/2001 | Szczukowski et al. | 411/353 |
| 6,340,019 | B1 * | 1/2002 | Eshleman et al. | 123/469 |
| 6,591,801 | B1 | 7/2003 | Fonville | |
| 6,872,040 | B2 * | 3/2005 | Deeg et al. | 411/353 |
| 7,100,264 | B2 * | 9/2006 | Skinner et al. | 29/523 |
| 7,143,749 | B1 * | 12/2006 | Colletti | 123/469 |
| 2001/0037911 | A1 | 11/2001 | Staniendda | |

FOREIGN PATENT DOCUMENTS

| | | |
|---|---|---|
| DE | 10 2005 002 603 A1 | 10/2005 |
| EP | 1262652 | 12/2002 |
| JP | 4086371 | 3/1992 |
| JP | 2001329931 | 11/2001 |

* cited by examiner

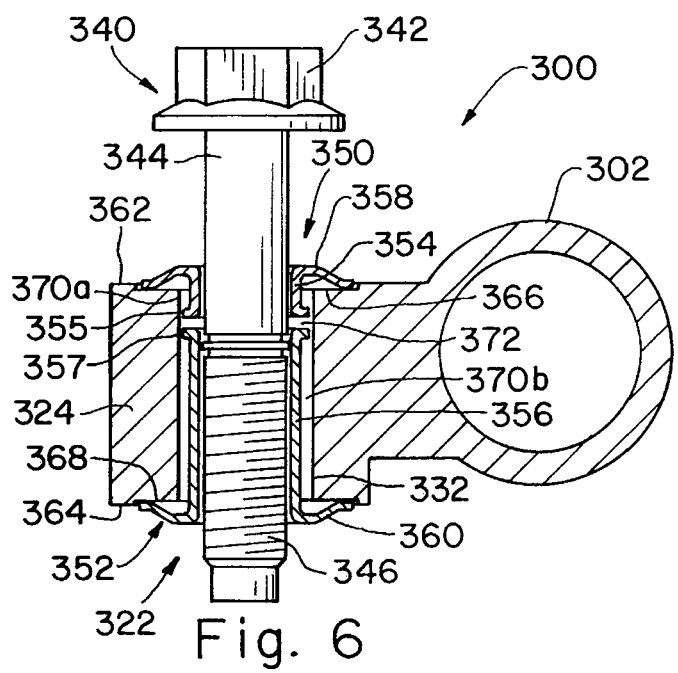
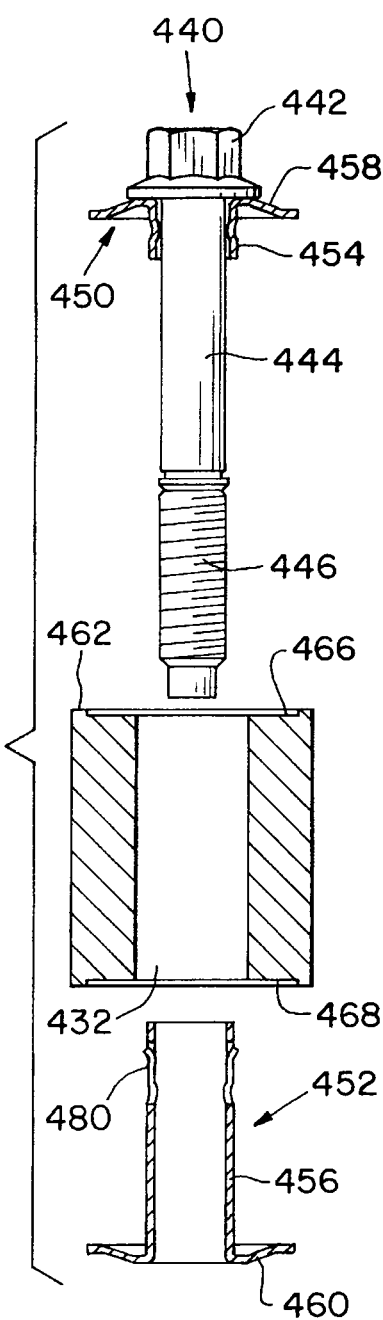
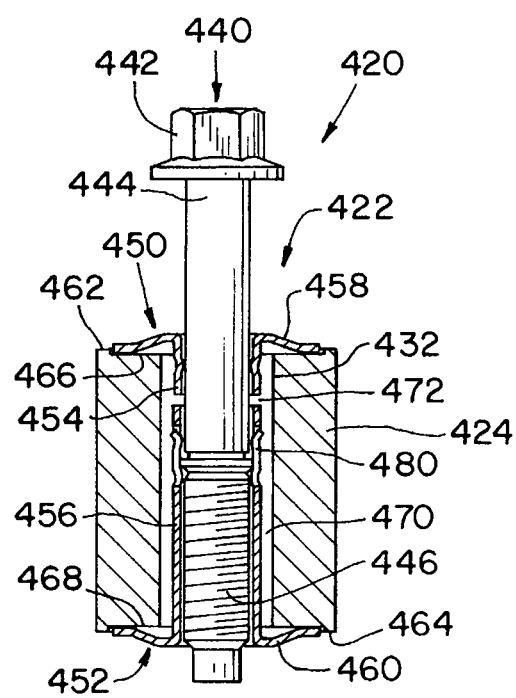

WORK PIECE ISOLATING ASSEMBLY

CROSS-REFERENCE TO RELATED APPLICATIONS

The present non-provisional U.S. patent application claims the benefits of U.S. provisional application for patent Ser. No. 60/847,452 filed on Sep. 27, 2006.

FIELD OF THE INVENTION

The present invention relates generally to assemblies that isolate a fastener connecting one work piece or component to another work piece or component, to minimize the transfer of a condition from one of the work pieces to the other of the work pieces by minimizing extensive, intimate, direct contact of the fastener and one of the work pieces. More particularly the invention pertains to an isolating fastener assembly for connecting a direct injection fuel rail isolation system to an engine.

BACKGROUND OF THE INVENTION

It is sometimes desirable to isolate a fastener from two components the fastener connects to inhibit the transfer of a condition such as heat, vibration or sound from one of the components to the other of the components. For example, steel wool isolators have been used as washers, grommets or sleeves to reduce heat transfer from one component to another component through the fastener connecting the components. Metal wool isolators can be used in conditions such as heat or the like in which rubber or synthetic elastomers are unsuitable.

Direct injection fuel delivery in automobile engines is achieved through large pressure drops in the fuel injectors. A fuel rail under high pressure, such as, for example, approximately 25,000 psi is subjected to a rapid decrease to approximately 0 psi when the ejector is opened to release fuel for combustion. It is known to provide a mounting boss on the fuel rail, and a bolt extended through the boss and anchored in the engine head. The sudden pressure drop at the tip of the injector upon opening creates a force vibration pulse that transmits from the injector tip back through the injector, through the fuel rail and into the engine head via the mounting bosses and connectors that secure the fuel rail to the engine. Thereafter, the vibration can travel in various directions in the engine. The transmitted vibration can result in the audible detection of an unsatisfactory clicking sound to the vehicle operator. Often the clicking sound can lead to an erroneous assumption of malfunction in the engine.

Accordingly, it is desirable to isolate the structures that interconnect the injector and the engine head via the fuel rail. The use of the aforedescribed mesh or metal wool pieces can work effectively; however, such barriers are relatively expensive to manufacture. Installation of the barriers can increase and complicate assembly time.

Generally, there are needs for isolating connectors that allow one work piece to be securely and safely mounted to another work piece, and that are economical to manufacture and assemble, and efficient to install; yet will isolate the transfer of a condition from one of the work pieces to the other of the work pieces.

SUMMARY OF THE INVENTION

The present invention provides a fastener assembly having spring members minimally engaging the attachment bosses between first and second components whereby the connector can be tightened to proof load with a prescribed under head clamp length, thereby isolating one of the components and preventing the isolated component from vibrating at the same frequency as the other component.

In one aspect of one embodiment thereof, the present invention provides an isolating connector for a work piece defining a hole there through. The isolating connector includes a first spring member having a first cylinder extending into the hole from a first side of the work piece and a first flange from an outer end of the first cylinder establishing springing engagement against a first side of the work piece. A second spring member has a second cylinder extending into the hole from a second side of the work piece and a second flange from an outer end of the second cylinder establishing springing engagement against a second side of the work piece. A bolt extends through the first and second cylinders for engaging a second work piece.

In another aspect of another embodiment thereof, the present invention provides an isolating assembly of a fuel rail to an engine head with a mounting boss on the fuel rail defining a first hole therethrough, and the head defining a second hole therein. A first spring member extends into the first hole from a first end thereof. The first spring member includes a first cylinder disposed in the first hole and a first domed shaped flange having a peripheral edge engaged against a first surface on a first side of the mounting boss. A second spring member extends into the first hole from a second end thereof. The second spring member includes a second cylinder disposed in the first hole and a second domed shaped flange having a peripheral edge engaged against a second surface on a second side of the mounting boss. A bolt extends through the first and second spring member cylinders and includes a head disposed against the first domed shaped flange and a threaded shaft engaged in the second hole.

In a still further aspect of a still further embodiment thereof, the present invention provides an isolating assembly with a first component defining a first hole therethrough, and a second component defining a second hole therein. A first spring member has a first cylinder and a first spring flange, with the first spring flange engaged against a first surface of the first component. A second spring member has a second cylinder and a second spring flange, with the second spring flange engaged against a second surface of the first component. At least one of the cylinders is disposed in the first hole. A bolt extends through the first and second cylinders and includes a head and a threaded shaft engaged in the second hole. The first and second spring members form a column between the bolt head and the second component.

An advantage of one aspect of the present invention is providing a connector assembly having controlled torque limiting features.

Another advantage of another aspect of the present invention is providing a connector assembly that can be installed quickly and easily.

Still another advantage of still another aspect of the present invention is providing a connector assembly between first and second components that effectively isolates one of the components from the other of the components to inhibit the transmission of vibrations from one of the components to the other of the components.

Yet another advantage of yet another aspect of the present invention is providing a connector assembly having spring members that can be effectively tuned for a desired damping effect between first and second components secured by the connector assembly.

A further advantage of a further aspect of the present invention is providing an isolating connector assembly that can be preassembled in component parts for subsequent installation in a final assembly.

A still further advantage of a still further aspect of the present invention is providing an isolating connector assembly useful with thin mounting brackets in both low mount and high mount installations Other features and advantages of the invention will become apparent to those skilled in the art upon review of the following detailed description, claims and drawings in which like numerals are used to designate like features.

BRIEF DESCRIPTION OF THE DRAWINGS

FIG. 6 is a cross-sectional view of still another embodiment of the present invention;

FIG. 7 is an exploded view of yet another embodiment of the present invention;

FIG. 8 is a cross-sectional view of the embodiment shown in FIG. 7, but in a preassembled condition;

Figure 1:
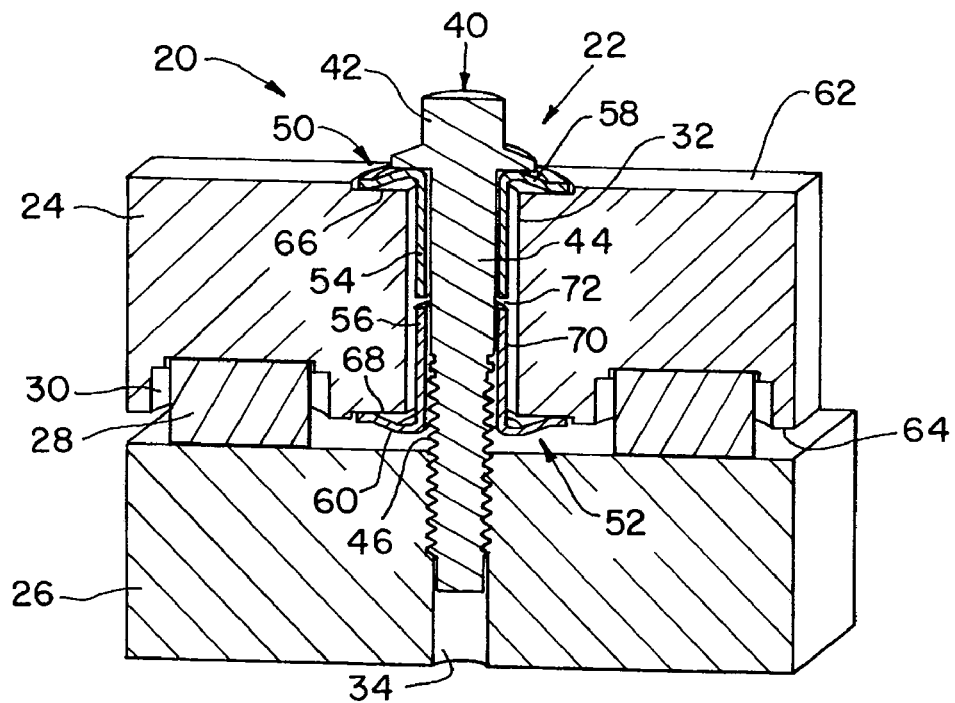
FIG. 1 is a cross-sectional view of a isolating assembly in accordance with the present invention, showing interconnection of two generic components or work pieces held by an isolating connector of the present invention.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use herein of "including", "comprising" and variations thereof is meant to encompass the items listed thereafter and equivalents thereof, as well as additional items and equivalents thereof.

DETAILED DESCRIPTION OF THE PREFERRED EMBODIMENT

Referring now more specifically to the drawings and to FIG. 1 in particular, numeral 20 designates an embodiment of an isolating assembly in accordance with the present invention in which an isolating connector 22 is used to connect a first component or work piece 24 to a second component or work piece 26. An annular isolator ring 28 is provided between first component 24 and second component 26 generally surrounding isolating connector 22, which extends between the first and second components 24, 26. Isolating ring 28 can be a gasket of silicone or other material, or such other elastomeric or other bushing, gasket or the like suitable for the application in which isolating connector 22 is used. As shown in FIG. 1, isolator ring 28 can be disposed in a depression 30 formed in one or both first component 24 and second component 26, with depression 30 being shown only in first component 24 in the exemplary embodiment.

Isolating connector 22 extends through a hole 32 disposed in first component 24 and is anchored in a hole 34 provided in second component 26. Isolating connector 22 establishes compression limitation between first component 24 and a second component 26 such that isolator ring 28 is not overly compressed or crushed.

Isolating connector 22 includes a threaded fastener 40 which in the exemplary embodiment is a bolt 40 having a head 42 and a shaft 44. A terminal portion of shaft 44 includes a thread 46 that engages hole 34 of second component 26. It should be understood that, depending on the nature of assembly 20 and the materials of which second component 26 is constructed, hole 34 can be pre-threaded for engaging thread 46 of bolt 40, or bolt 40 can have a thread cutting thread 46 which forms a thread in second component 26 as bolt 40 is rotated therein for anchoring. Further, second component 26 can have a threaded insert installed therein for receiving and engaging bolt 40.

Isolating connector 22 further includes a first spring member 50 and a second spring member 52 provided in confronting relationship and springing engagement on opposite sides of first component 24. Spring members 50, 52 include first and second cylinders 54, 56 respectively extending into hole 32 from opposite ends thereof. Spring function is provided in spring members 50, 52 by first and second continuous, annular spring rims configured as first and second domed flanges 58, 60 that are provided at the outer ends of and cupped toward cylinders 54, 56 respectively. Domed flanges 58, 60 extend outwardly of hole 32 in springing engagement against first and second surfaces 62, 64 respectively, of first component 24. Domed flanges 58, 60 are disposed in counter bores 66, 68 of first and second surfaces 62, 64 respectively.

Diameters of first hole 32 and cylinders 54, 56 are selected such that an annular space 70 is provided in hole 32 between cylinders 54, 56 and the surface of first component 24 defining hole 32. Diameters of domed flanges 58, 60 and counter bores 66, 68 in which the domed flanges are disposed are selected such that domed flanges 58, 60 partially flatten but do not fully flatten before the peripheral edges of domed flanges 58, 60 encounter the outer edges defining counter bores 66, 68. Axial lengths of cylinders 54, 56 are selected with reference to the axial length of first hole 32 such that a confronting space 72 between the confronting inner ends of cylinders 54, 56 closes as spring members 50, 52 compress and flatten slightly such that the peripheral edges of domed flanges 58, 60 are engaged against the outer edges of counter bores 66, 68. FIG. 1 illustrates a ready to tightened condition in which confronting space 72 remains and domed flanges 58, 60 are not yet engaged against the outer edges of counter bores 66, 68. As bolt 40 is tightened domed flanges 58, 60 flatten slightly and cylinders 54, 56 move axially toward each other until end edges thereof meet and confronting space 72 closes. Accordingly, a metal column is formed by cylinders 54, 56 between bolt head 42 and second component 26, and a desired amount of pre-load can be applied to spring members 50, 52 on opposite sides of first component 24. The solid column formed by cylinders 54, 56 limits the axial displacement of the top and bottom spring members 50, 52 to a predetermined height. Accordingly, as bolt 40 is tightened the designed preload or tension is achieved.

Figure 2:
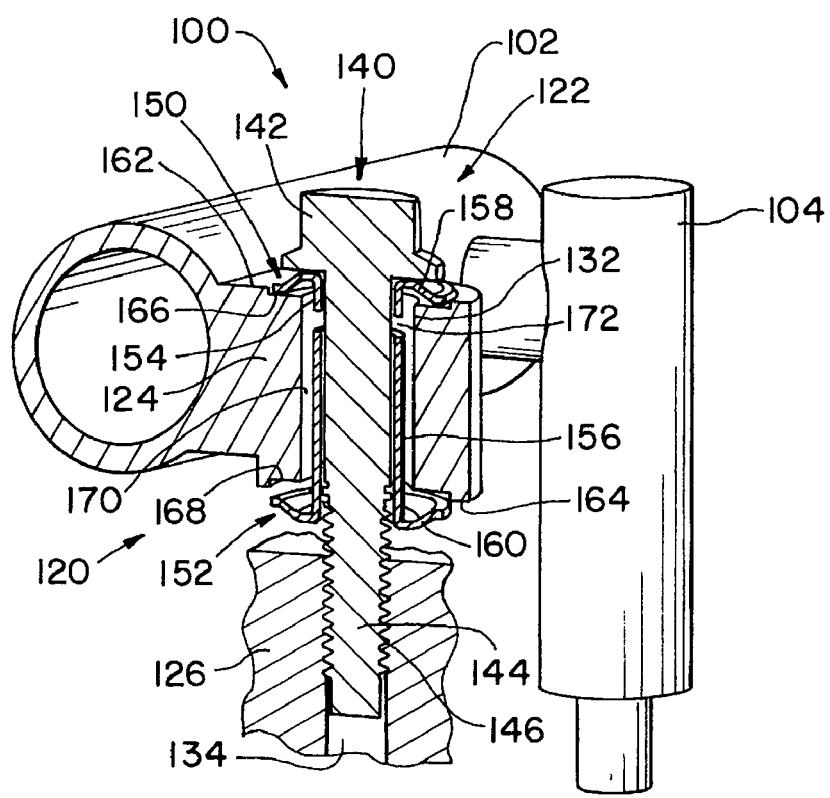
FIG. 2 is a cross-sectional view of a direct injection fuel rail isolation assembly in accordance with the present invention.
Figure 3:
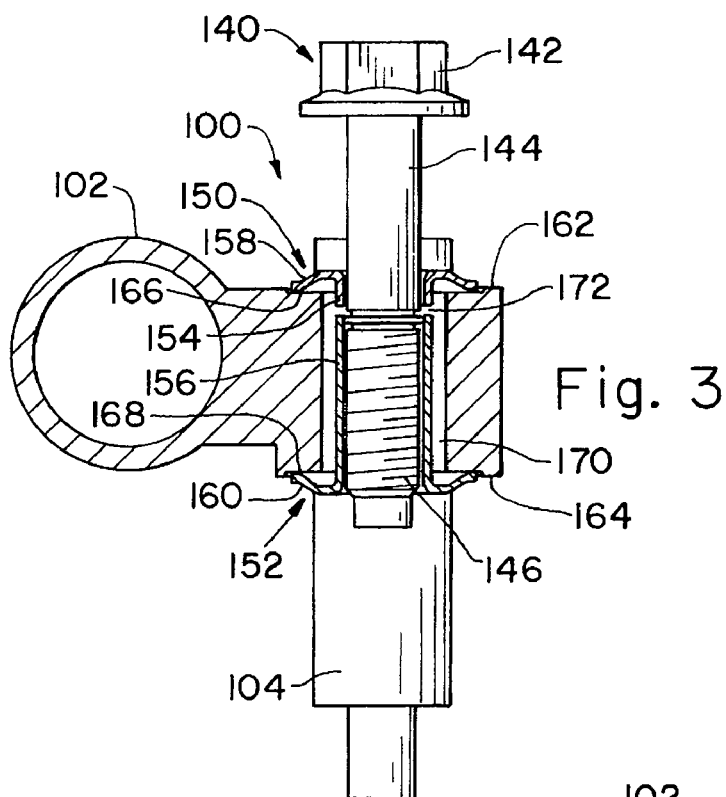
FIG. 3 is a cross-sectional view similar to that of FIG. 2, but illustrating the isolation assembly from a different angle and in a different adjusted position before connection of the fuel rail shown in therein to an engine.
Figure 4:
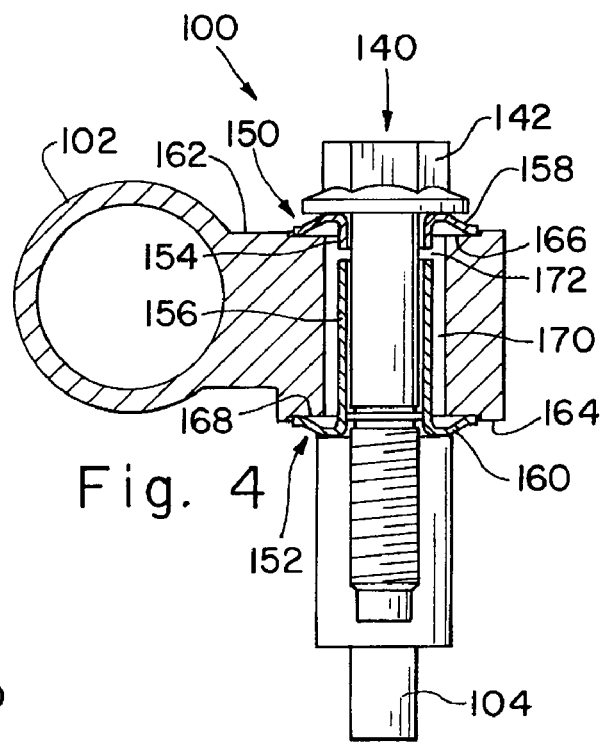
FIG. 4 is a cross-sectional view similar to that of FIG. 3, but illustrating the isolation assembly in yet another arrangement prior to connection of the fuel rail shown to an engine.

FIGS. 2-4 illustrate an application of the present invention in a vehicle fuel system 100 having a fuel rail 102 and a fuel injector 104 extending therefrom. An isolating assembly 120, which is similar to isolating assembly 20, includes an isolating connector 122 interconnecting a first component in the nature of a fuel rail mounting block 124 to a second component in the nature of an engine head portion or mounting block 126. Mounting block 124 and head 126 define first and second holes 132 and 134, respectively. Connector 122 includes a bolt 140 having a head 142 and a shaft 144 defining a thread 146 as described previously for bolt 40. First and second spring members 150, 152 similar to spring members 50, 52 have first and second cylinders 154, 156, respectively, and first and second domed flanges 158, 160, respectively. First and second cylinders 154, 156 extend into hole 132 from opposite ends thereof. First and second surfaces 162, 164 of mounting block 124 define first and second counter bores 166, 168 adjacent to and outwardly of hole 132 for operating with domed flanges 158, 160 as described previously with respect to isolating connector 22. While cylinders 54, 56 of isolating connector 22 described previously were of substantially similar lengths, in the embodiment illustrated for connector 122, first cylinder 154 is of substantially shorter axial length than the axial length of second cylinder 156. However, each still define an annular space 170 with the surface of mounting block 124 defining hole 132, and a confronting space 172 is provided at the inner confronting ends of cylinders 154, 156 which closes as bolt 140 is tightened such that first and second cylinders 154, 156 meet to define a column between bolt head 42 and head 126, and establish the amount of preload applied to the connection, as described above with respect to connector 22.

Figure 5:
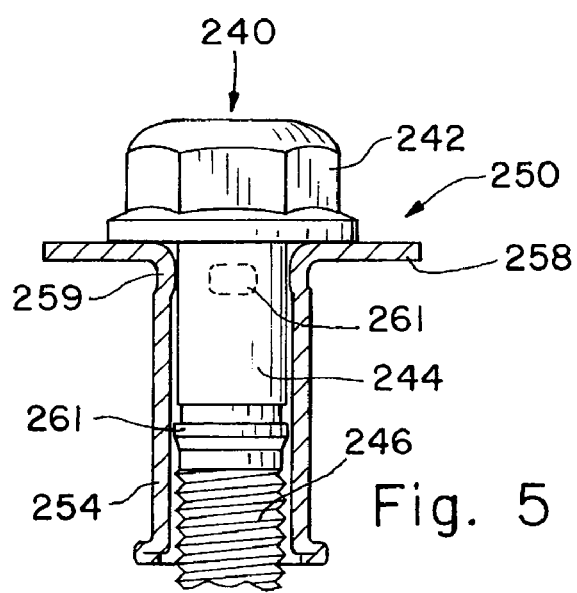
FIG. 5 is a cross-sectional view of another embodiment of the present invention.

In some applications and uses of the present invention it may be advantageous to provide firmly established relative positions of bolts to one or more of the spring members. In an embodiment of the present invention illustrated in FIG. 5, a bolt 240 has a head 242 and a shaft 244 defining a thread 246. A first spring member 250 has a cylinder 254 and a flange 258 defining a constriction 259 of a diameter so as to engage shaft 244 and hold bolt 240 in an established position for handling and installation. Alternatively, or in conjunction with constriction 259, bolt 240 can be provided with one or more protuberance 261 to engage spring member 250. It should be understood that constriction 259 and/or protuberance 261 can be of discrete limited area or can define rings substantially surrounding spring member 250 or bolt 240, respectively, protuberances 261 of both types being shown in FIG. 5.

Figure 14:
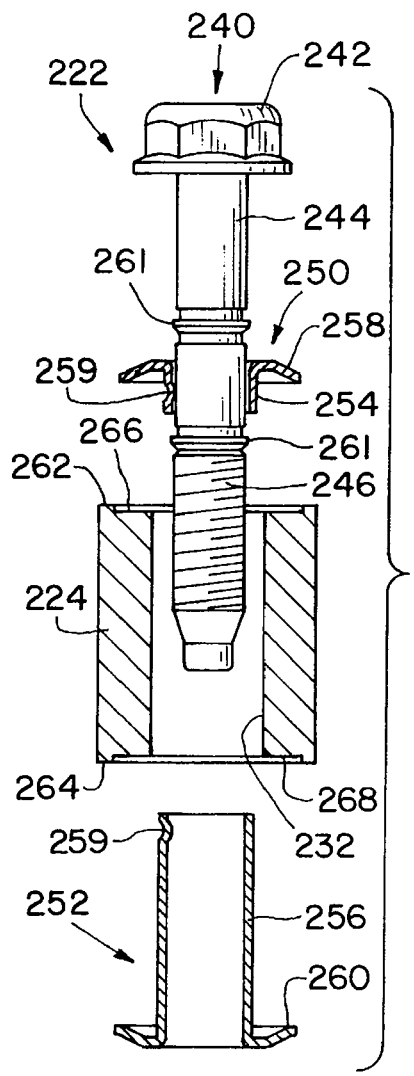
FIG. 14 is an exploded view in cross-section of still another embodiment of the present invention.
Figure 15:
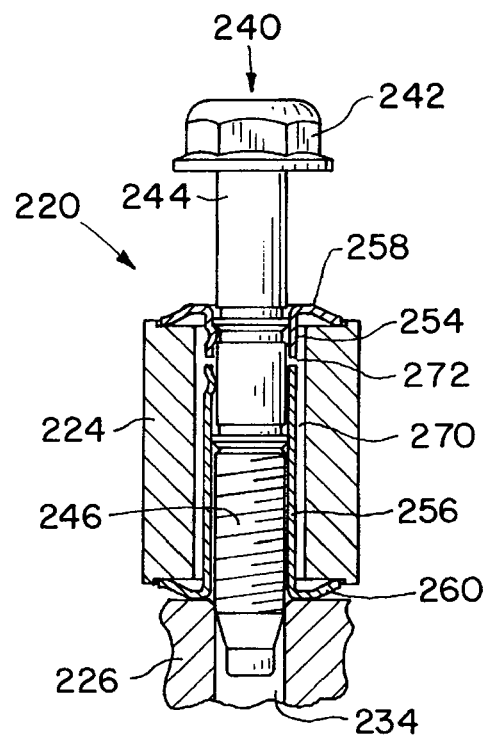
FIG. 15 is a cross-sectional view of an isolating assembly using the isolating connector embodiment shown in FIG. 14, showing the assembly in a condition to start tightening of the connector.
Figure 16:
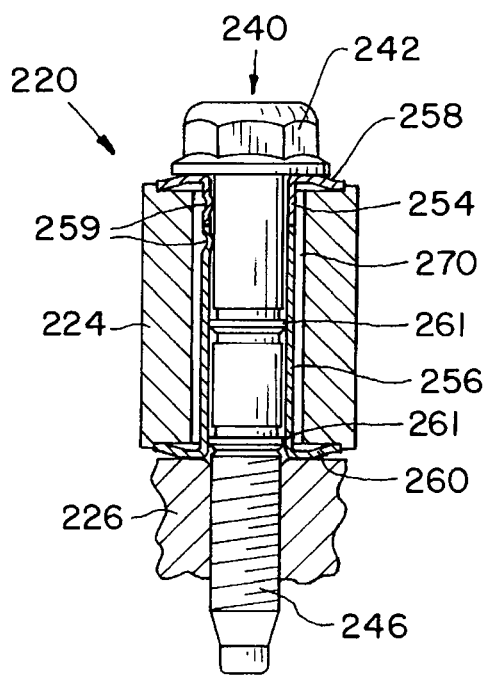
FIG. 16 is a cross-sectional view of the isolating assembly shown in FIG. 15, but illustrating the assembly in a tightened condition.

Constrictions 259 in spaced relation on the spring member and/or one or more protuberance 261 on bolt 240 can operate in conjunction one with the other whereby the bolt can be inserted with the protuberance sliding past a constriction and lodging between two spaced constrictions to inhibit axial movement of the bolt relative to the spring member in either direction to provide pre-assembly of the components. FIGS. 14-16 illustrate an isolating assembly 220 using the bolt capturing features just described. An isolating connector 222 is assembled in a fuel rail mounting block 224 and connects to an engine head portion or mounting block 226. Mounting block 224 and head 226 define holes 232 and 234, respectively. Connector 222 includes bolt 240 having head 242 and shaft 244 defining threads 246. First spring member 250 and a second spring member 252 have first cylinder 254 and second cylinder 256 respectively, extending into hole 232 from opposite ends thereof. First domed flange 258 and second dome flange 260 extend from outer ends of cylinders 254, 256, respectively, along and against first surface 262 and second surface 264 defining counter bores 266, 268 respectively. Each cylinder 254 and 256 defines one or more constriction 259 as described previously. Bolt 240 defines first and second protuberances 261 as described previously in the nature of outwardly projecting rings. An annular space 270 is provided between the surface defining hole 232 and cylinders 254, 256. A confronting space 272 is provided between the confronting ends of cylinders 254, 256. As with the confronting spaces in the embodiments described previously, space 272 closes as bolt 240 is tightened such that cylinders 254, 256 establish a continuous column. FIG. 16 illustrates the tightened condition in which confronting space 272 has been closed and cylinders 254, 256 establish a continuous column between bolt head 242 and head 226. In this manner, spring members 250, 252 can be provided pre-assembled in mounting block 224 with bolt 240 while providing the isolating and compression limiting features of the embodiments described previously herein.

In still further applications of the present invention, it may be advantageous to provide a pre-assembly of the first and second spring members in the first component, with or without the bolt therein. In FIG. 6, a fuel system 300 includes a fuel rail 302. An isolating connector 322 is provided pre-assembled in a fuel rail mounting block 324 defining a hole 332. Connector 322 includes a bolt 340 having a head 342 and a shaft 344 defining threads 346. A first spring member 350 and a second spring member 352 have first cylinders 354 and second cylinders 356 respectively, extending into hole 332 from opposite ends thereof. Inner ends of cylinder's 354, 356 define radially outwardly extending flanges 355, 357, respectively, that minimally engage the surface defining hole 332 to maintain positions of spring members and 350, 352 within a hole 332. Flanges 355, 357 can be continuous annular bodies or one or more discrete body of limited length. If at least three such bodies or a continuous annular body is used, centering of the cylinder within hole 332 is maintained. First domed flange 358 and second dome flange 360 extend from outer ends of cylinders 354, 356, respectively, along and against first surface 362 and second surface 364 defining counter bores 366, 368 respectively. Annular spaces 370a and 370b are provided between the surface defining hole 332 and cylinders 354, 356, respectively. Before final tightening, a confronting space 372 is provided between the confronting ends of cylinders 354, 356, which include flanges 355, 357. Again, space 372 closes as bolt 340 is tightened such that flanges 355, 357 meet and cylinders 354, 356 establish a continuous column beneath head 342. In this manner, spring members 350, 352 can be provided pre-assembled in mounting block 324 while providing the isolating and compression limiting features of the embodiments described previously herein. By incorporating the bolt retention feature of FIG. 5 or other such engagement, bolt 340 can also be provided in a pre-assembled position.

It should be understood also that various combinations of constrictions 259, protuberances 261 and/or radial flanges 355, 357 can be used with the bolt and first and second spring members to provide progressive preassembly. For example, the bolt can be preassembled to the first spring member at one location, and thereafter transported to another location for installation in the first component. The preassembled bolt and first spring member can then be inserted in the first component, and the second spring member connected to the bolt from the opposite side of the first component. Thereafter the preassembled first component and isolating connector can be transported to yet another location where final assembly takes place by connecting the bolt to the second component. Using constrictions, protuberances and the like the preassembly of the first component with the complete isolating connector including the bolt and first and second spring members can be transported in tact.

Figure 9:
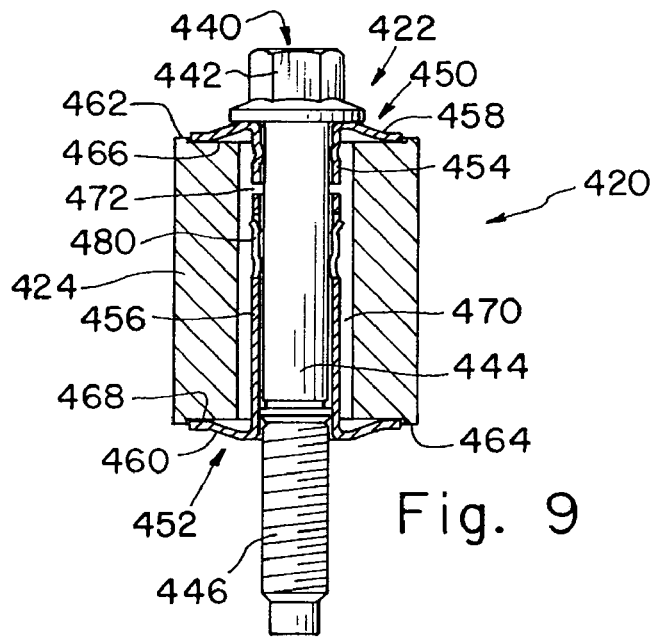
FIG. 9 is a cross-sectional view of the isolation system shown in FIGS. 7 and 8, but illustrating another condition of preassembly.

FIGS. 7, 8 and 9 illustrate yet another embodiment of the present invention in which an isolating assembly 420 includes an isolating connector 422 secured in a first component 424 for anchoring to a second component (not shown). A hole 432 defined in first component 424 receives a bolt 440 having a head 442, a shaft 444 and defining a thread 446. First and second spring members 450, 452 include cylinders 454, 456, respectively, extending into hole 432 from opposite ends thereof; and domed flanges 458, 460, respectively, extending along and against first and second surfaces 462, 464 and received in counter bores 466, 468. An annular space 470 is defined between the surface defining hole 432 and cylinders 454, 456, respectively. Prior to final tightening, a confronting space 472 is defined between confronting inner end edges of cylinders 454, 456. When final tightening occurs, confronting space 472 closes and cylinders 454, 456 establish a continuous column beneath head 442, as described with the previous embodiments. As thus far described, isolating assembly 420 is similar to isolating assembly 120 described previously. However, in isolating assembly 420, isolating connector 422 defines a second stage spring in addition to the compression limitation provided by domed flanges 458, 460. A second stage spring 480 is defined in one or both cylinders 454, 456; which in the exemplary embodiment is provided in second cylinder 456. Axial compression between cylinders 454, 456 is limited by the spring strength of second stage spring 480. Second stage spring 480 is an area configured or weekend so as to cause radially outward buckling if cylinder 456 is placed in axial compression. The strength of second stage spring 480 can be provided to establish the desired compression limiting function, and may include a weakened or pre-buckled area within the cylinder 456, or the removal of material in window-like fashion to establish axial segments that will buckle at a desired compression.

Figure 10:
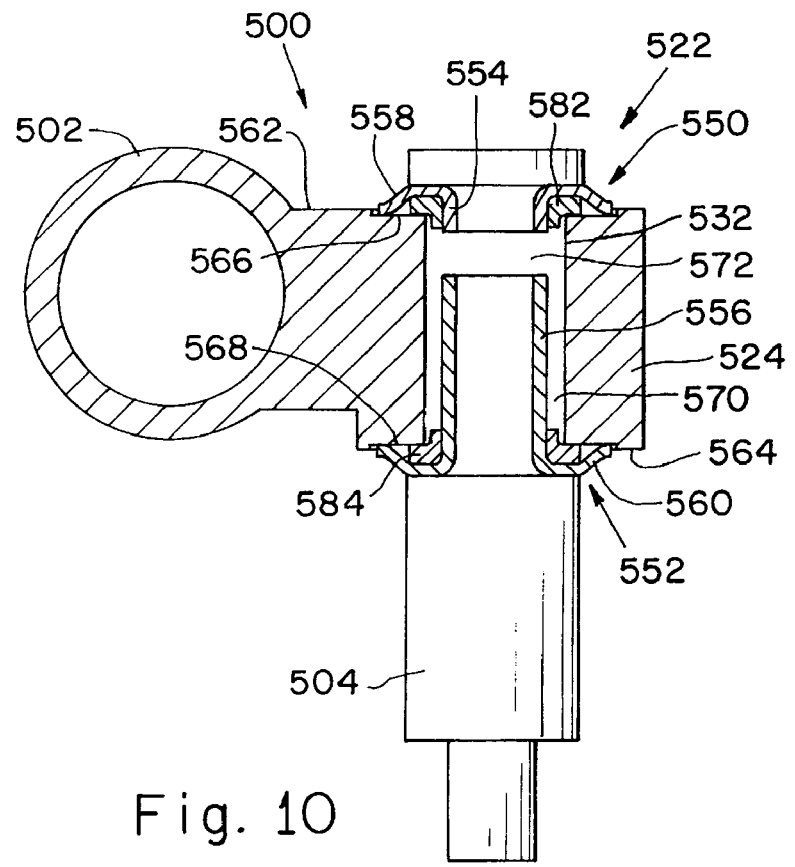
FIG. 10 is a cross-sectional view of still another embodiment of the present invention.

FIG. 10 shows yet another embodiment of the present invention wherein a fuel system 500 includes a fuel rail 502 and a fuel injector 504. An isolating connector 522 is associated with a mounting block 524 defining a hole 532, and includes a bolt (not shown) similar to bolts 140, 240, 340 and 440 as described previously herein. First and second spring members 550, 552 include first and second cylinders 554, 556 extending into hole 532 from opposite ends thereof, and first and second domed flanges 558, 560 all as described previously with respect to the other embodiments. Domed flanges 558, 560 extend along and against first and second surfaces 562, 564, respectively defining undercuts 566, 568. An annular space 570 is defined between the surface establishing hole 532 and cylinders 554, 556. A confronting space 572 is defined between the inner end edges of cylinders 554, 556 in the non-tightened connector. Space 572 closes in the tightened connector 522 to establish a column formed from cylinders 554, 556 to limit the axial displacement of top and bottom spring members 550, 552 and define the desired amount of preload in the connector, as described for previous embodiments. The embodiment of the present invention illustrated as isolating connector 522 provides additional damping or resiliency to that established by domed flanges 558, 560. Elastomeric dampening rings 582, 584 are provided within domed flanges 558, 560, respectively, to provide additional damping to that provided by the spring affect from domed flanges 558, 560. Dampening rings 582, 584 in the exemplary embodiment include both axial and radial components relative to hole 532. Accordingly, a portion of each dampening ring 582, 584 rests on counter bores 566, 568, respectively, while another portion of each dampening ring 582, 584 extends partly into hole 532.

It can be seen from the aforedescribed embodiments that the domed flanges received in the counter bores, together with the bolt held in spaced relation to the mounting block or first component establish conditions in which vibrations do not short readily through the bolt from one component or work piece to another component or work piece. Instead, vibrations are directed through the first and second spring members, and because of the resilient, yet yielding connection provided by the spring members the two connected components or work pieces do not vibrate at the same frequencies. Accordingly, sound transmission from one component to the other component is restricted. Further, only minimal contact areas are provided between the first and second spring members and the first component, whereby conditions such as heat are not readily transferred. Again, with the bolt held in spaced relation within the hole through the first component, heat transmission is minimized. Lateral shift can be controlled by the counter bore in the component, which allows for a single bolt or spring design to be used with full tolerance stack up.

Shaped holes through the first component or work piece can be used to provide desired shift for alignment purposes. Holes that are oval or oblong in cross-section can be used. Alternatively, oversize holes through the first component can be used in conjunction with desired shapes for the counter bores on opposite ends thereof allowing directed shifting of the first and second spring members in desired directions. The use of oversized holes in the first component further reduces the material used in the component.

The embodiments thus far described include spring members of substantially continuous configuration provided from the continuous annular spring rim of an annular dome shaped flange. However, it should be understood that other types of spring members, including a plurality of discrete individual spring members also can be used.

Figure 11:
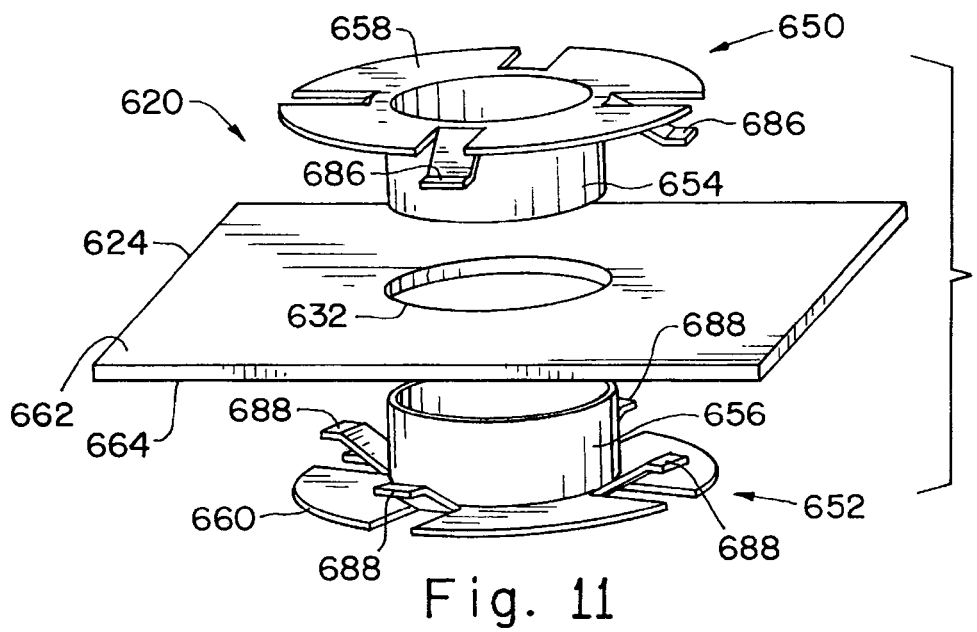
FIG. 11 is a cross-sectional view of a further embodiment of the present invention in exploded form.
Figure 12:
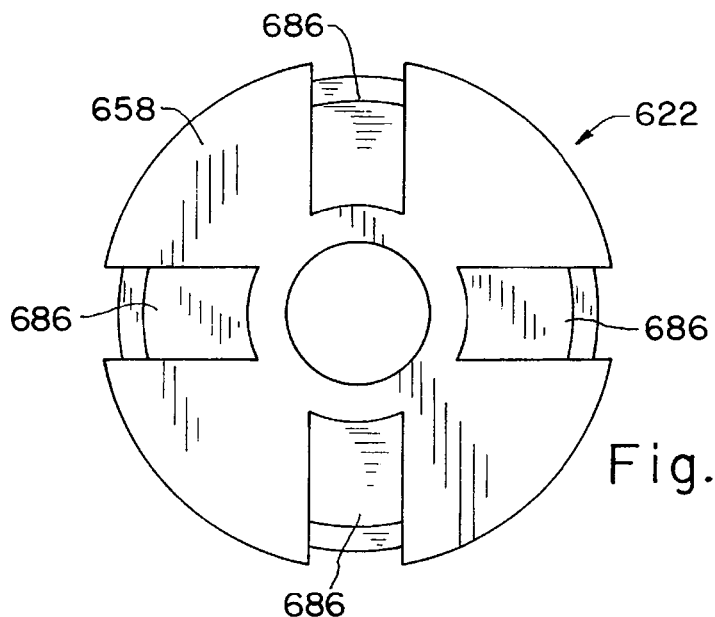
FIG. 12 is a top plan view of the embodiment shown in FIG. 11.
Figure 13:
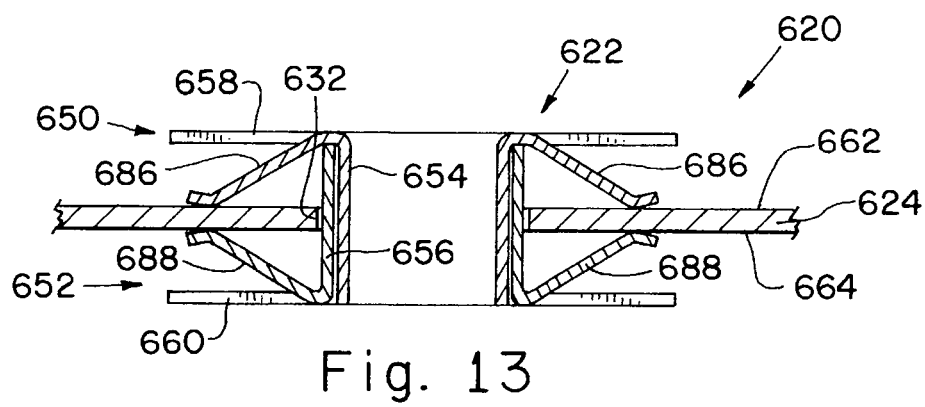
FIG. 13 is a cross-sectional view of an isolating assembly using the isolating connector shown in FIGS. 11 and 12.

FIGS. 11, 12 and 13 illustrate yet a further embodiment of the present invention in which an isolating assembly 620 includes an isolating connector 622 associated with a first component 624 defining a first hole 632. A bolt (not shown) similar to the bolts previously described herein is provided for isolating connector 622. First and second spring members 650, 652 extend into hole 632 from opposite ends thereof. First spring member 650 includes a first cylinder 654 and second spring member 652 includes a second cylinder 656. First spring member 650 defines a first flange 658 and second spring member 652 defines a second flange 660 provided outwardly of hole 632. Second cylinder 656 is of a diameter sufficiently larger than a diameter of first cylinder 654 such that first cylinder 654 will slide into second cylinder 656 in telescoping fashion. A plurality of spring elements in the way of angular arms 686 are provided in first flange 658, and similar spring elements 688 are provided in second flange 660. Spring elements 686, 688 engage first and second surfaces 662, 664 of component 624, respectively. While illustrated as inwardly directed arms, spring elements 686, 688 may be of various spring biasing devices or constructions such as clips, beams, ramps or the like.

First and second cylinders 654, 656 can simply slide easily one into the other, or mechanical interlocks or interfaces such as clasps, bars, latches, slots and/or tabs may be used to secure one cylinder to the other cylinder. As illustrated in FIG. 13, first component 624 is secured between the oppositely directed spring elements 686, 688 to provide a yielding connection therebetween. The spring elements exert a biasing force on the work piece. The biasing forces are oppositely directed so that each opposes the other. The bolt (not shown) can be captured within first cylinder 654, or may simply extend therethrough to anchor into the second component (not shown). The strength in axial compression provided by the combined wall thicknesses of the two tubes acts as a torque limiter, thereby allowing the bolt to be tightened to proof load with the proper under-head clamp strength. The combined wall thickness, therefore, transfers load from under the head of the tightened bolt to a structure to which the isolation system is secured by the continuous column formed by first and second spring members 650, 652. The combined wall thicknesses, which provide a torque limiter, prevent the bolt load from overloading the work piece. By isolating the work piece and allowing the bolt to stretch in proof load, the isolation system according to this embodiment of the present invention prevents the work piece from vibrating at the same frequency as the mating surface.

The work piece isolating assemblies thus far described have been described with respect to installation in mounting blocks or other relatively thick structures. In some instances, relatively thin mounting structures are provided, such as stamped metal brackets or the like. FIGS. 17-22 illustrate embodiments of the present invention useful in thin bracket systems. Each includes telescoping features similar to that described with respect to the embodiment shown in FIGS. 11-13.

An isolating assembly 720 (FIG. 19) includes an isolating connector 722 associated with a first component 724 to connect to a second component 726, via holes 732, 734 defined in components 724, 726, respectively. A bolt 740 similar to the bolts previously described herein is provided for isolating connector 722, and includes a head 742, a shaft 744 and a thread 746 on at least a part of shaft 744. First and second spring members 750, 752 include first and second elongated cylinders 754, 756, respectively, and first and second domed flanges 758, 760, respectively. First domed flange 758 of first spring member 750 is cupped toward first cylinder 754, whereas second domed flange 760 is outwardly cupped away from second cylinder 756. Constrictions 759 and one or more protuberance 761 can be provided on cylinder 754 and bolt 740 to allow for preassembly of cylinder 754 with bolt 740, and/or similar constrictions 759 can be provided in cylinder 756 to allow for preassembly of first and second spring members 750, 752 with first component 724.

First spring member 750 extends into hole 732 with first domed flange 758 engaging a first surface 762 of first component 724 and first cylinder 754 projecting substantially beyond an opposite, second surface 764 of first component 724. Second cylinder 756 is of a diameter sufficiently larger than a diameter of first cylinder 754 such that first cylinder 754 will slide into second cylinder 756 in telescoping fashion. First and second spring members 750, 752 are similarly aligned directionally such that second domed flange 760 engages second surface 764 of first component 724 and second cylinder 756 extends outwardly beyond first component 724 with first cylinder 754 contained therein.

Figure 18:
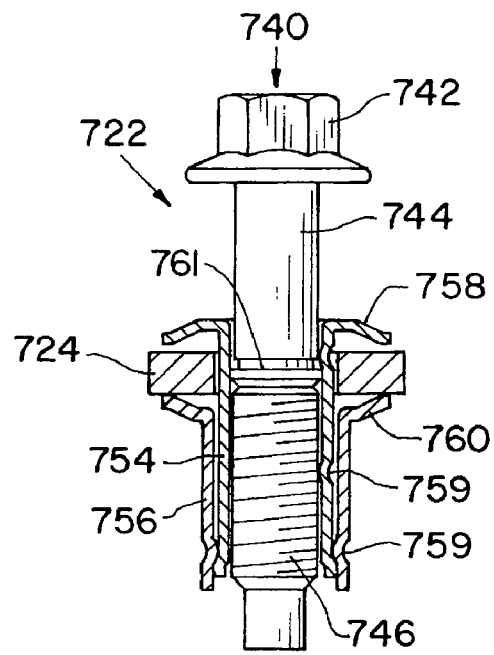
FIG. 18 is a cross-sectional view of the thin bracket and isolating connector shown in FIG. 17 assembled for connecting to another component.
Figure 19:
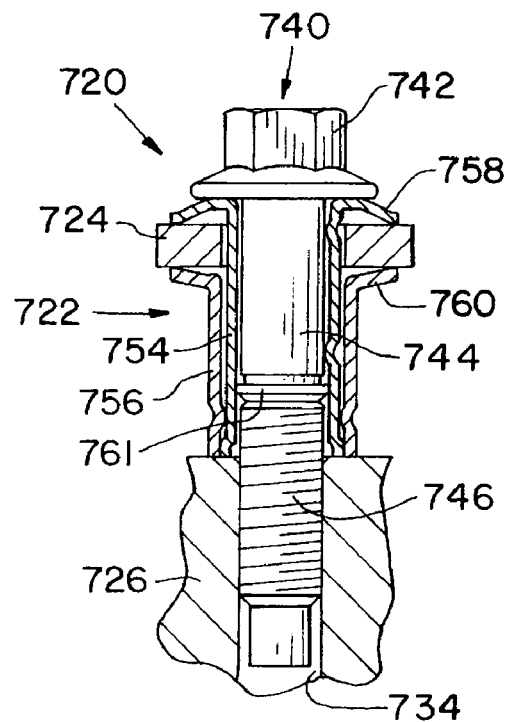
FIG. 19 is a cross-sectional view of an isolating assembly using the embodiment of the isolating connector shown in FIGS. 17 and 18.

As illustrated in FIGS. 18 and 19, first component 724 is secured between the oppositely cupped first and second domed flanges 758, 760; and the lengths of first and second cylinders 754, 756 are selected such that as bolt 740 is tightened into second component 726 end edges of cylinders 754, 756 abut against second component 726 and a desired preload can be achieved. The lengths of first and second cylinders 754, 756 determine an amount of offset or spacing between first and second components 724, 726 by establishing a continuous column from beneath head 742 to second component 726.

Figure 17:
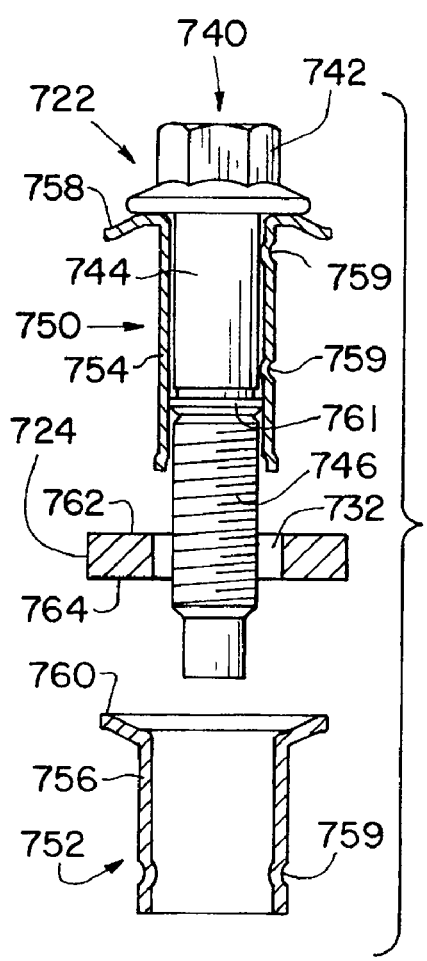
FIG. 17 is an exploded, cross-sectional view of an embodiment of the present invention suitable for use with thin brackets.
Figure 20:
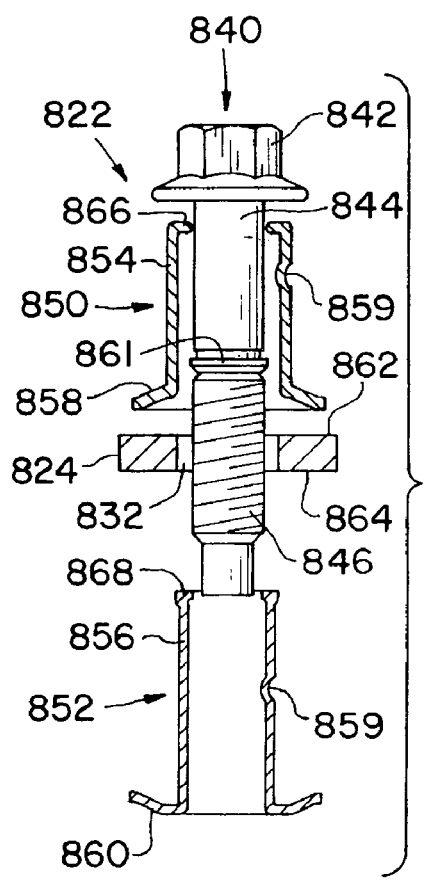
FIG. 20 is an exploded, cross-sectional view of another embodiment of the present invention suitable for use with thin brackets.
Figure 21:
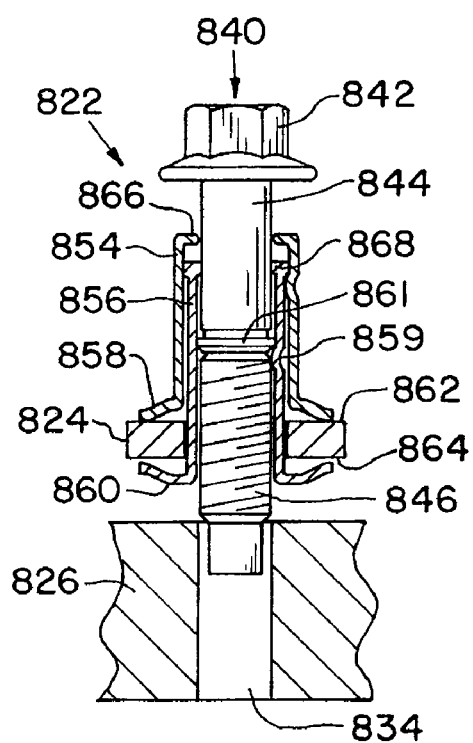
FIG. 21 is a cross-sectional view of an isolating assembly using the isolating connector embodiment shown in FIG. 20, showing the assembly in a condition to start tightening of the connector.
Figure 22:
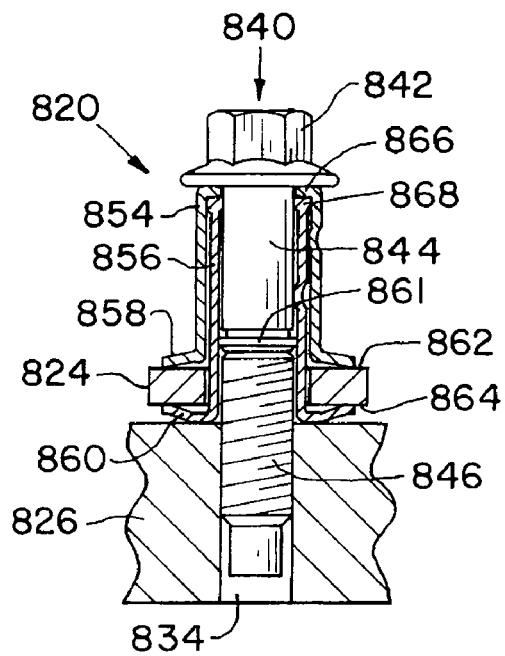
FIG. 22 is a cross-sectional view of the isolating assembly shown in FIG. 21, but illustrating the assembly in a tightened condition.

FIGS. 20-22 illustrate an embodiment of the present invention useful for thin bracket connections in which the components are not remotely spaced as shown in FIGS. 17-19 but are instead closely positioned one to another. An isolating assembly 820 (FIG. 22) includes an isolating connector 822 associated with a first component 824 to connect to a second component 826, via holes 832, 834 defined in components 824, 826, respectively. A bolt 840 similar to the bolts previously described herein is provided for isolating connector 822. Bolt 840 includes a head 842, a shaft 844 and a thread 846. First and second spring members 850, 852 include first and second elongated cylinders 854, 856, respectively, and first and second domed flanges 858, 860, respectively. First domed flange 858 of first spring member 850 is outwardly cupped in a direction away from first cylinder 854, whereas second domed flange 860 is cupped inwardly toward second cylinder 856. Constrictions 859 and one or more protuberance 861 can be provided on cylinder 854, cylinder 856 and bolt 840 to allow for preassembly of the spring members 850, 852, bolt 840 and first component 824.

First domed flange 858 is disposed against a first surface 862 of first component 824, with first cylinder 854 extending outwardly beyond first surface 862. Second spring member 852 extends into hole 832 from an opposite side of first component 824 such that second domed flange 860 engages a second surface 864 of first component 824 and second cylinder 856 extends through hole 832 and beyond first surface 862. First cylinder 854 is of a diameter sufficiently larger than a diameter of second cylinder 856 such that second cylinder 856 will slide into first cylinder 854 in telescoping fashion. Ends of cylinders 854, 856 remote from domed flanges 858, 860 can be provided with inwardly and outwardly directed rims 866, 868, respectively, to stack against one another in the tightened connector.

As illustrated in FIGS. 21 and 22, first component 824 is secured between the oppositely cupped first and second domed flanges 858, 860; and the lengths of first and second cylinders 854, 856 are selected such that as bolt 840 is tightened into second component 826 end edges of cylinders 854, 856 abut or stack against bolt head 842 such that a desired pre-load can be achieved. The lengths of first and second cylinders 854, 856 determine an amount of offset or spacing between first component 824 and bolt head 842 by establishing a continuous column therebetween.

Embodiments of the present invention provide an isolating connection that allows a work piece to be securely and safely mounted to another structure or work piece while isolating on from the other. By isolating one work piece from the other work piece, conditions such as heat, vibration and the like are not readily transmitted from one to the other. The spring members limit direct contact, and provide damping so that vibrations within selected frequencies are not readily transmitted through the connector. Controlled shift between the spring members and the counter bore keeps a vibration path from shorting through the bolt.

The drawn metal springs of the various embodiments disclosed herein have favorable tolerance stack with repeatable load curves. The load does not decay over time to a permanent set or creep in the material. The spring members of the present invention can be tuned to a desired stiffness, to resist specific mass displacement. Compression can be designed well below the yield point for long fatigue lives. Further, the springs can be tuned to match the desired isolation across a target frequency range to provide lower transmissibility ratios within target frequency bands.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. An isolating connector for a work piece defining a hole there through, said isolating connector comprising:
    a first one-piece spring member made of a single material having a first cylinder extending into the hole from a first side of the work piece and a first flange from an outer end of said first cylinder establishing springing engagement against a first surface of the work piece along the first side of the work piece;
    a second one-piece spring member made of a single material having a second cylinder extending into the hole from a second side of the work piece and a second flange from an outer end of said second cylinder establishing springing engagement against a second surface along the second side of the work piece; said first and second surfaces defining first and second counter bores therein; wherein said first and second flanges are dome shaped with peripheral edges thereof engaging said first and second counter bores, respectively, without flattening of said dome shaped flanges; and
    a bolt extending through said first and second cylinders for engaging a second work piece.

2. The isolating work piece of claim 1, said first and second cylinders being telescopically engaged one within the other.

3. The isolating connector of claim 1, said first and second cylinders defining a space between inner ends thereof with said peripheral edges of said domed shaped flanges engaged against outer edges of said first and second counter bores.

4. The isolating connector of claim 1, said first and second cylinders being in spaced relation to said work piece within said hole.

5. The isolating connector of claim 1, including an elastomeric member disposed between at least one of said spring members and said work piece.

6. The isolating connector of claim 1, at least one of said spring members defining a constriction engaging said bolt.

7. The isolating connector of claim 1, at least one of said cylinders defining a second stage spring along a portion of the axial extent thereof.

8. The isolating connector of claim 1, at least one of said cylinders providing limited contact with said work piece in said hole.

9. An isolating assembly of a fuel rail to an engine head comprising:
    a mounting boss on said fuel rail defining a first hole therethrough;
    said head defining a second hole therein;
    a first spring member made entirely of metal extending into said first hole from a first end thereof, said first spring member including a first cylinder disposed in said first hole and a first domed shaped flange having a peripheral edge engaged against a first surface on a first side of said mounting boss;
    a second, discrete spring member made entirely of metal extending into said first hole from a second end thereof, said second spring member including a second cylinder disposed in said first hole and a second domed shaped flange having a peripheral edge engaged against a second surface on a second side of said mounting boss; said first and second surfaces defining first and second counter bores, respectively, to engage said peripheral edges of said first and second dome shaped flanges without flattening of said dome shaped flanges; and
    a bolt extending through said first and second spring member cylinders and including a head disposed against said first domed shaped flange and a threaded shaft engaged in said second hole.

10. The isolating assembly of claim 9, said first and second cylinders engaging each other end to end in said first hole with said peripheral edges of said dome shaped flanges engaged against outer edges of said counter bores.

11. The isolating assembly of claim 10, said first and second cylinders being in spaced relation to said mounting boss within said first hole.

12. The isolating assembly of claim 9, said first and second cylinders being in spaced relation to said mounting boss within said first hole.

13. The isolating assembly of claim 9, including a dampening ring disposed between at least one of said dome shaped flanges and said mounting boss.

14. The isolating assembly of claim 9, at least one of said spring members defining a constriction engaging said bolt.

15. The isolating assembly of claim 9, at least one of said cylinders defining a second stage spring along a portion of the axial extent thereof.

16. The isolating assembly of claim 9, at least one of said cylinders providing limited interfering contact with said mounting boss in said first hole.

17. An isolating assembly comprising:
- a first component defining a first hole therethrough;
- a second component defining a second hole therein;
- a first spring member having a first cylinder and an integrally formed first spring flange, said first spring flange engaged against a first surface of said first component;
- a second spring member having a second cylinder and an integrally formed second spring flange, said second spring flange engaged against a second surface of said first component; said first and second surfaces defining first and second counter bores therein; wherein said first and second flanges are dome shaped with peripheral edges thereof engaging said first and second counter bores, respectively, without flattening of said dome shaped flanges;
- at least one of said cylinders disposed in said first hole;
- a bolt extending through said first and second cylinders and including a head and a threaded shaft engaged in said second hole; and
- said first and second spring members configured to form a continuous column between said bolt head and said second component.

18. The isolating assembly of claim 17, said first and second cylinders being disposed telescopically one within the other.

19. The isolating assembly of claim 17, said first and second cylinders engagable against each other end to end.

* * * * *